(12) United States Patent
Phillips

(10) Patent No.: US 10,167,887 B1
(45) Date of Patent: Jan. 1, 2019

(54) BEAM JOINING APPARATUS WITH BOLT AND THREADED WEDGE

(71) Applicant: Cal M. Phillips, Platteville, WI (US)

(72) Inventor: Cal M. Phillips, Platteville, WI (US)

( * ) Notice: Subject to any disclaimer, the term of this patent is extended or adjusted under 35 U.S.C. 154(b) by 0 days.

(21) Appl. No.: 15/721,770

(22) Filed: Sep. 30, 2017

(51) Int. Cl.
| | | |
|---|---|---|
| *B60D 1/02* | (2006.01) | |
| *B60D 1/48* | (2006.01) | |
| *F16B 2/14* | (2006.01) | |
| *F16B 7/04* | (2006.01) | |
| *F16B 7/18* | (2006.01) | |
| *B62D 33/04* | (2006.01) | |
| *E04B 1/24* | (2006.01) | |

(52) U.S. Cl.
CPC .............. *F16B 7/044* (2013.01); *B60D 1/02* (2013.01); *B60D 1/48* (2013.01); *B62D 33/044* (2013.01); *F16B 2/14* (2013.01); *F16B 7/187* (2013.01); *E04B 2001/2457* (2013.01); *Y10T 403/7067* (2015.01); *Y10T 403/7194* (2015.01)

(58) Field of Classification Search
CPC . B60D 1/00; B60D 1/02; B60D 1/025; B60D 1/28; B60D 1/36; B60D 1/48; B60D 1/52; B62D 33/044; E04B 2001/2457; E04H 2017/1465; E04H 2017/1478; F16B 2/14; F16B 7/044; F16B 7/0446; F16B 7/0453; F16B 7/0466; F16B 7/0493; F16B 7/187; F16B 12/2009; F16B 12/2027; F16B 12/32; Y10T 403/42; Y10T 403/4602; Y10T 403/4694; Y10T 403/7064; Y10T 403/7066; Y10T 403/7067; Y10T 403/7096; Y10T 403/7194; Y10T 403/725

USPC ...... 403/205, 231, 263, 374.1, 374.2, 374.3, 403/382, 400, 402; 256/70
See application file for complete search history.

(56) References Cited

U.S. PATENT DOCUMENTS

| | | | | |
|---|---|---|---|---|
| 3,421,726 | A | * | 1/1969 | Getter ................... B60P 7/0807 296/43 |
| 3,623,690 | A | * | 11/1971 | Bargnnan, Jr. ........ B60P 7/0807 296/167 |
| 3,847,495 | A | | 11/1974 | Peter et al. |
| 3,849,015 | A | | 11/1974 | Peter et al. |
| 3,985,460 | A | | 10/1976 | Piper et al. |
| 4,114,977 | A | | 9/1978 | Polidori |
| 4,171,822 | A | | 10/1979 | Thun |
| 4,268,185 | A | | 5/1981 | Mullenberg |
| 4,396,310 | A | | 8/1983 | Mullenberg |
| 4,579,477 | A | | 4/1986 | Hartman |

(Continued)

FOREIGN PATENT DOCUMENTS

DE            2816579 A   * 11/1978

*Primary Examiner* — Josh Skroupa
(74) *Attorney, Agent, or Firm* — John V. Stewart

(57) ABSTRACT

A first beam (1) is inserted through a transverse opening (4) in a tubular second beam (2). A bolt (7) is inserted through unthreaded holes (9A, 9B) in the second beam. The bolt may be transverse to both beams. A wedge (5) is threaded onto the bolt inside the second beam (2). Tightening the bolt moves the wedge against a side of the first beam, forcing it against surfaces (11, 12, 13) of the transverse opening (4) opposite the wedge. The bolt counters the reaction to this force. The beams can be formed as extrusions. The joint only requires machining for the transverse opening (4) and smoothbore bolt holes (9A, 9B) for a single bolt. The second beam may have a rectangular cross section with relatively thicker corners (2A-2D) and thinner mid-walls (2E-2H).

15 Claims, 3 Drawing Sheets

(56) References Cited

U.S. PATENT DOCUMENTS

| | | |
|---|---|---|
| 5,452,529 A | 9/1995 | Neuenfeldt et al. |
| 5,536,102 A | 7/1996 | Kao |
| 5,888,015 A | 3/1999 | Brown et al. |
| 6,027,279 A * | 2/2000 | Skjaeveland ............ B25G 3/00 403/370 |
| 6,030,142 A * | 2/2000 | Malizia ................. F16M 11/38 403/374.4 |
| 8,801,106 B2 | 8/2014 | Franklin et al. |

* cited by examiner

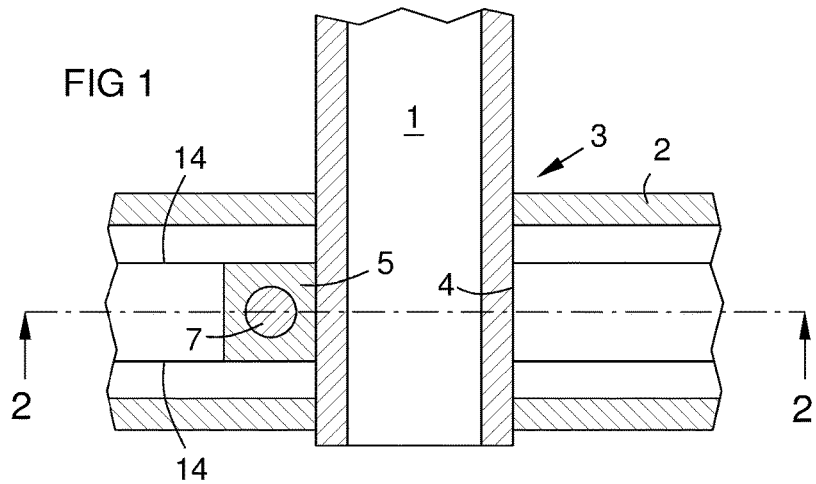
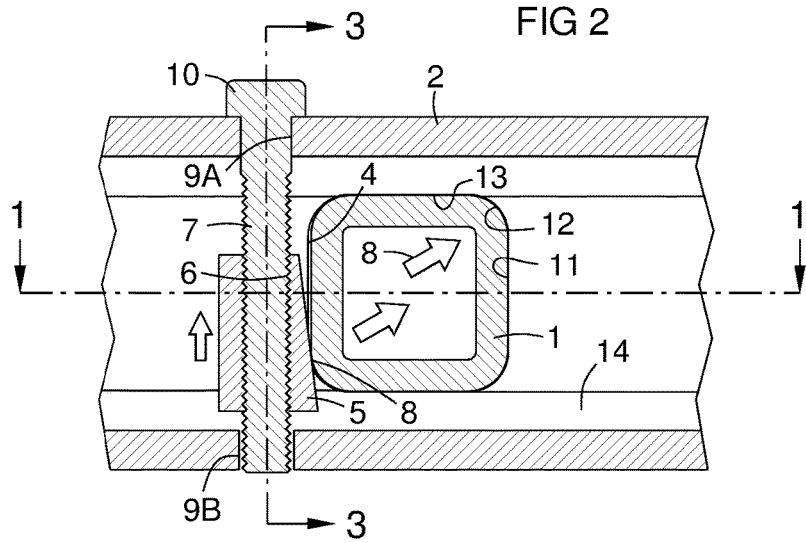

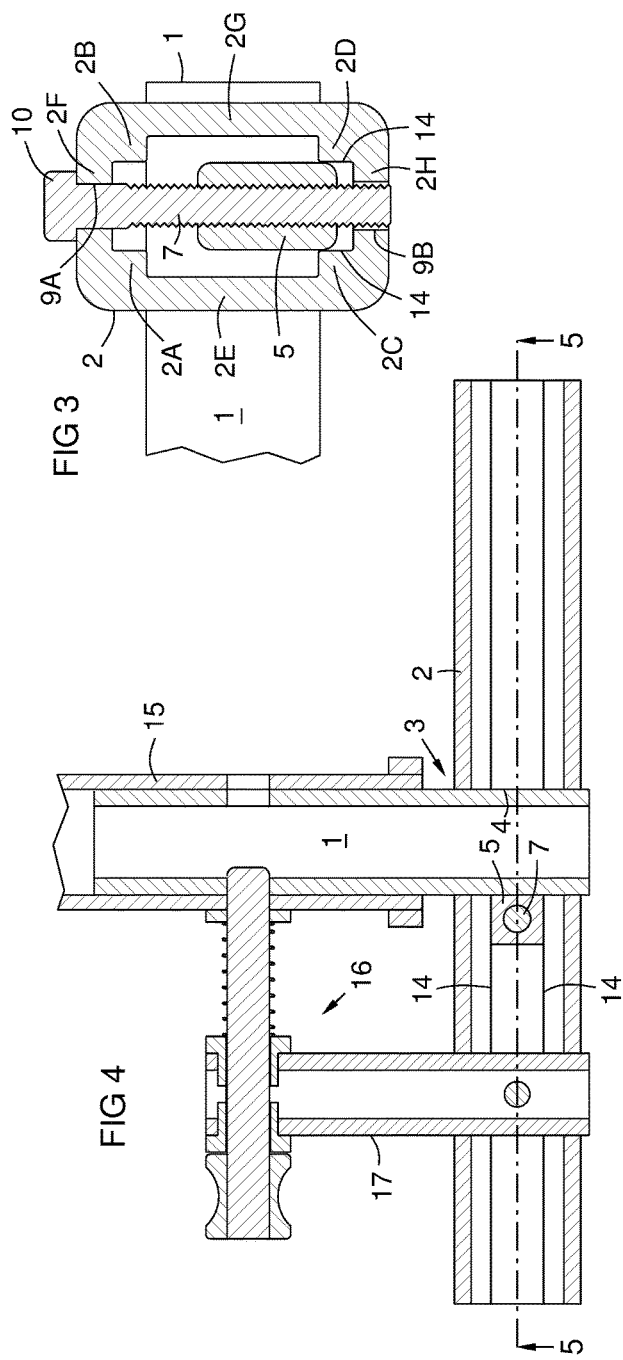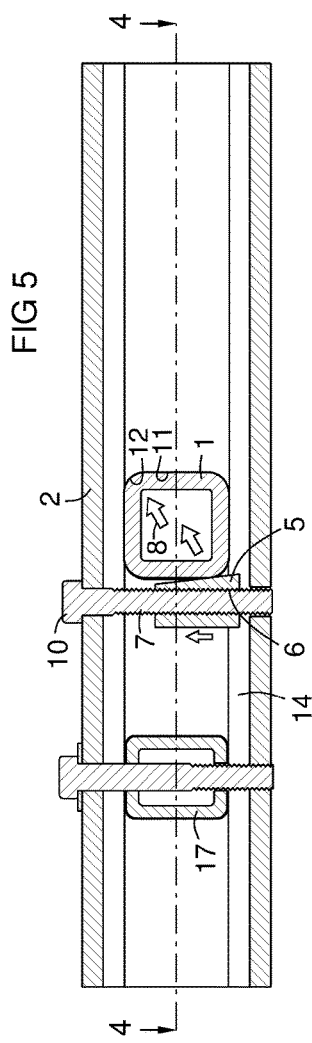

BEAM JOINING APPARATUS WITH BOLT AND THREADED WEDGE

FIELD OF THE INVENTION

This invention relates to devices for joining two beams without welding or adhesives, and particularly relates to a bolt that tightens a wedge against a first beam that is inserted through a transverse opening in a second tubular beam.

BACKGROUND OF THE INVENTION

Beams are joined by welding, bolts, clamps, adhesives, screws, nails and other means. Welding produces a strong, stable joint. However, welding of structural aluminum alloys such as 6061-T6 and others is expensive and time-consuming. The weld requires post-weld heat treatment, and can sometimes crack during treatment or in use. This increases costs of manufacturing aluminum structures.

For example, a bike carrier may be supported from a drawbar in a trailer hitch receiver on a motor vehicle. Strength and durability are needed in a joint between the drawbar and a crossbar supporting the bike carrier. Bolts can be used, but eliminating play requires a clamping action of the crossbar opening on the drawbar. Two vertical bolts through the crossbar may straddle the drawbar and compress the drawbar by reducing the opening via slots in the crossbar. This is taught in a related patent application of the present inventor U.S. Ser. No. 15/396,710 filed Jan. 2, 2017.

The present invention provides an improved connection apparatus that does not require slots in the crossbar, only requires one bolt, minimizes machining, and firmly and reliably locks the drawbar to the crossbar without welding.

BRIEF DESCRIPTION OF THE DRAWINGS

The invention is explained in the following description in view of the drawings that show:

FIG. 1 is a top sectional view of a trailer hitch drawbar taken on line 1-1 of FIG. 2 with a crossbar attached in accordance with aspects of an embodiment.

FIG. 2 is a sectional view taken on line 2-2 of FIG. 1.

FIG. 3 is a transverse sectional view of the crossbar taken on line 3-3 of FIG. 2.

FIG. 4 is a top sectional view taken on line 4-4 of FIG. 5 of a drawbar inserted in a trailer hitch receiver tube, with a crossbar attached to the drawbar according to aspects of an embodiment.

FIG. 5 is a sectional view taken on line 5-5 of FIG. 4.

DETAILED DESCRIPTION OF THE INVENTION

Figure 6:
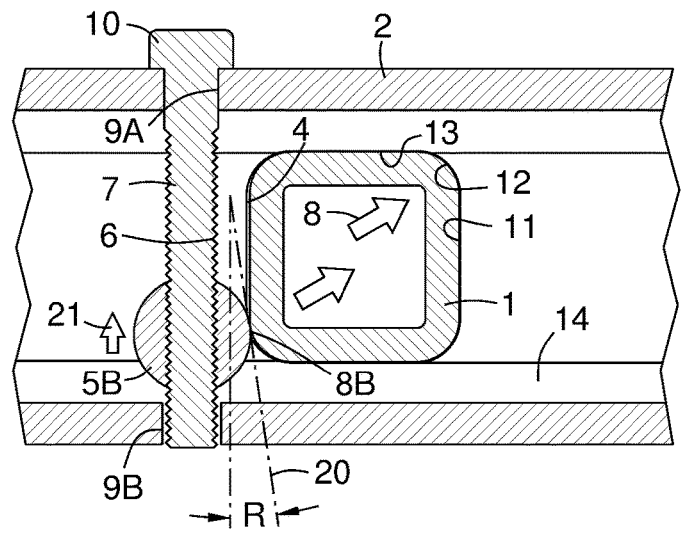
FIG. 6 is a sectional view illustrating a cylindrical wedge embodiment.

FIG. 1 is a top sectional view of a first beam 1 joined to a second beam 2 at a joint 3. The first beam 1 is exemplified by a drawbar for a trailer hitch receiver. The second beam 2 is exemplified by a transverse bar or crossbar to support an accessory such as a bike rack. The crossbar 2 is preferably tubular with a transverse opening 4 into which the drawbar is inserted transversely to the crossbar. A channel 14 may be provided in the interior of the crossbar 2 that contacts two opposed sides of the wedge 5, and prevents rotation of the wedge before strong contact is established with the drawbar by tightening. The drawbar 1 may be tubular or solid.

FIG. 2 is a sectional view taken on line 2-2 of FIG. 1 showing the wedge 5 with a threaded hole 6 with a bolt 7 threaded therein. The wedge has a varying thickness or ramp is located between the threaded hole 6 and a ramp surface 8 of the wedge. Thickness of the ramp increases with distance from the bolt head 10. Tightening the bolt draws the wedge toward the bolt head, presses the ramp surface 8 against a first side of the drawbar, and jams the drawbar against surfaces 11, 12, 13 of the opening 4 opposite the wedge. This tightens and clamps the drawbar in the opening 4, and prevents it from twisting. The bolt is inserted through two opposed unthreaded holes 9A, 9B in the crossbar 2. This makes it substantially a doubly supported fixed beam that opposes reaction to the wedge forces 8. It may be prevented from rotating for example by a lock washer. Unthreaded holes" in this context means holes in which threads on the bolt do not engage threads in the holes. For example, as shown in the drawings, bolt holes 9A, 9B may be smoothbore. The bolt may be oriented orthogonally to both the drawbar and the crossbar.

The taper angle of the wedge may be less than 7 degrees, or less than 4 degrees, to provide a self-holding taper that prevents loosening of the wedge until the bolt 7 is unscrewed and tapped downward. The maximum self-holding taper angle depends on the material and surface treatments of the drawbar and the wedge. A lock washer may be provided under the bolt head 10. During tightening, the wedge is prevented from turning by its contact with the side of the drawbar 1.

A benefit of this design is that both the drawbar 1 and the crossbar can be extruded parts with minimal machining and no welding. The drawbar requires no modification for this joint apparatus. The crossbar only requires two opposed smoothbore holes 9A, 9B for the bolt 7 and an opening 4 for the drawbar. Only one bolt is needed. These factors reduce cost and time compared with other joining methods, including welding, and there is no possibility of a weld failure.

FIG. 3 is a sectional view of the crossbar 2 with the drawbar 1 inserted through it. The crossbar 2 may be tubular with substantially rectangular walls. The walls of the crossbar may have relatively thicker corner portions 2A, 2B, 2C, 2D and relatively thinner mid-wall portions 2E, 2F, 2G, 2H. Two of the thicker corners 2C, 2D may form a channel 14 between them that contacts sides of the wedge 5 to prevent turning of the wedge when the bolt is turned. This contact does not oppose reaction to the force of the wedge on the drawbar. The reaction to this force (8 in FIG. 2) on the bolt is opposed by the bolt holes 9A, 9B. The bolt may flex slightly, which helps lock the bolt and wedge in the tightened position.

Tightening of the wedge may press the drawbar 1 against upper thicker corner portions 2A, 2B of the crossbar, as indicated by contact point 13 in FIG. 2. This contact improves strength and rigidity of the joint. By using symmetric thicker corner portions 2A, 2B, 2C, 2D, the extruded crossbar 2 can be set-up for machining in either vertical orientation, eliminating setup mistakes. The thickened corners and thinner walls as shown also provide a structural benefit based on the second moment of area of the crossbar as a beam, maximizing its strength and rigidity while minimizing weight.

FIG. 4 is a top sectional view of the drawbar 1 inserted in a trailer hitch receiver tube 15, and an attached crossbar 2 supporting a captive pin device 16 via an arm 17. This illustrates an exemplary application of the joining device and method herein.

FIG. 5 is a sectional view taken on line 5-5 of FIG. 4. The present apparatus is shown joining the drawbar 1 to the crossbar as previously described. This apparatus could also be used for joining the arm 17 to the crossbar, but it is not shown for that connection for comparison.

FIG. 6 is sectional view from the viewpoint of FIG. 2 illustrating a cylindrical embodiment 5B of the wedge. The wedge 5B may be cylindrical with an axis (normal to the page in this view) aligned with the drawbar 1. The ramp surface 8B is a cylindrical surface with a ramp angle R defined by a plane 20 tangent to the cylindrical surface at the line of contact between the cylindrical surface 8B and the drawbar 1. The ramp angle R decreases with upward motion 21 of the wedge 5B due to tightening of the bolt 7. The size of the cylinder may be selected in combination with the spacing of the bolt 7 from the opening 4 such that the cylindrical wedge becomes tight at ramp angles less than 7 degrees or less than 4 degrees. If desired, these parameters may be selected such that the ramp angle R decreases to zero at a predetermined torque limit on the bolt, preventing excess torque. Such a cylindrical wedge can be easily tapped and cut to length by a CNC screw machine.

Figure 7:
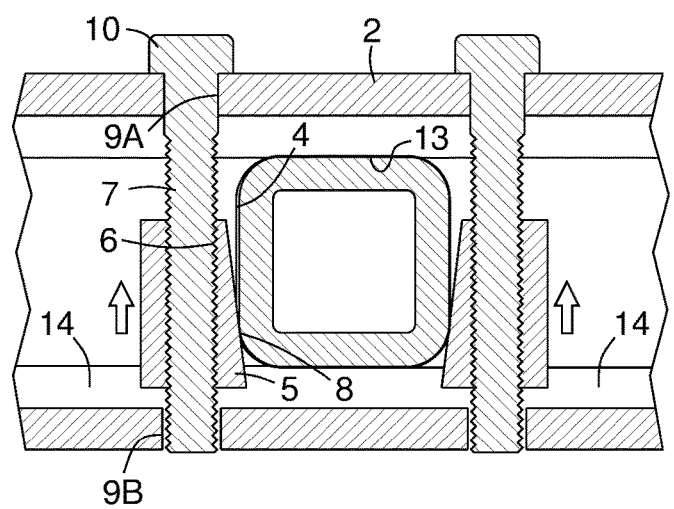
FIG. 7 is a sectional view illustrating a two-wedge embodiment.

FIG. 7 is a sectional view from the viewpoint of FIG. 2 illustrating a double wedge embodiment. However, a second bolt and wedge as shown is not needed. An advantage of the invention is that only one bolt is needed and only one wedge is needed.

While various embodiments of the present invention have been shown and described herein, such embodiments are provided by way of example only. Changes and substitutions may be made without departing from the invention. It is intended that the invention be limited only by the scope and intended meaning of the appended claims.

The invention claimed is:

1. An apparatus comprising:
 a first structural element inserted in an opening in a second structural element;
 a threaded bolt inserted through two unthreaded holes in respective opposite walls of the second structural element, with a head of the bolt stopped against a surface of the second structural element; and
 a wedge comprising an internally threaded hole with the bolt threaded therein;
 wherein the wedge comprises a varying thickness between the threaded hole and a ramp surface of the wedge, and said varying thickness increases with distance from the bolt head;
 wherein the ramp surface of the wedge contacts a side surface of the first structural element inside the second structural element;
 wherein tightening of the bolt in the threads of the wedge causes the wedge to apply a force against the first structural element that jams the first structural element against a surface of said opening opposite the wedge; and
 wherein the wedge comprises a cylinder with a cylindrical ramp surface providing a varying ramp angle defined by a plane that is tangent to the cylindrical ramp surface at a line of contact between the cylindrical ramp surface and the first structural element, and the varying ramp angle progressively decreases with the tightening of the bolt.

2. The apparatus of claim 1 wherein:
 the first and second structural elements are elongated;
 the first structural element is inserted into said opening in the second structural element in transverse relation to the second structural element; and
 the bolt is aligned orthogonally to both the first and the second structural elements.

3. The apparatus of claim 1 wherein the second structural element does not comprise a surface that contacts the wedge on a side thereof opposite the ramp surface of the wedge.

4. The apparatus of claim 1, wherein:
 the second structural element is tubular, comprising substantially rectangular walls as seen in a transverse sectional view;
 the walls of the second structural element comprise relatively thicker corner portions and relatively thinner mid-wall portions; and
 said tightening of the wedge presses the first structural element against first and second thicker corner portions of the second structural element.

5. The apparatus of claim 1, wherein the second structural element comprises a tube extruded with an interior channel that contacts two opposed sides of the wedge, preventing turning of the wedge during turning of the bolt but does not oppose a reaction to the force of the wedge against the first structural element.

6. An apparatus comprising:
 a trailer hitch drawbar inserted transversely into an opening in a tubular crossbar;
 a threaded bolt inserted through aligned unthreaded holes in top and bottom walls of the crossbar with a head of the bolt stopped against a top surface of the crossbar; and
 a wedge comprising an internally threaded hole with the bolt threaded therein;
 wherein the wedge comprises a ramp of varying thickness between the threaded hole and a ramp surface of the wedge, and said varying thickness increases with distance from the bolt head;
 wherein the ramp surface of the wedge contacts a side surface of the drawbar inside the crossbar;
 wherein tightening of the bolt in the threads of the wedge causes the wedge to apply a force against the drawbar that jams the drawbar against a surface of said opening opposite the wedge;
 wherein the crossbar is tubular, comprising substantially rectangular walls as seen in a transverse sectional view;
 wherein the walls of the crossbar comprise relatively thicker corner portions and relatively thinner mid-wall portions; and
 wherein said tightening of the wedge presses the drawbar against first and second thicker corner portions of the crossbar.

7. The apparatus of claim 6 wherein:
 the drawbar and crossbar are elongated;
 the drawbar is inserted through said opening in the crossbar transversely to the crossbar; and
 the bolt is aligned transversely to both the drawbar and the crossbar.

8. The apparatus of claim 6 wherein:
 the crossbar does not contain a surface that directly contacts the wedge and opposes a reaction to the force of the wedge against the side surface of the drawbar.

9. The apparatus of claim 6, wherein the crossbar comprises a tube extruded with an interior channel that contacts two opposed sides of the wedge, preventing turning of the wedge during turning of the bolt but not opposing a flexing of the bolt in reaction to the force of the wedge against the drawbar.

10. An apparatus comprising
a first beam inserted through a transverse opening in a tubular second beam;
a bolt received in first and second unthreaded holes in respective opposite walls in the second beam with a head of the bolt on an exterior surface of the second beam; and
a wedge threaded onto the bolt inside the second beam;
wherein tightening the bolt moves the wedge toward the head of the bolt causing a ramp of the wedge to move against a side of the first beam, forcing the first beam against a surface of the transverse opening opposite the wedge;
wherein the second beam comprises a substantially rectangular tubular cross section with relatively thicker corners and relatively thinner mid-walls as seen in the cross section, and two of the relatively thicker corners define an extruded channel between them that contacts opposite sides of the wedge, preventing rotation of the wedge.

11. The apparatus of claim 10, wherein no part of the second beam directly contacts the wedge on a side thereof that significantly opposes a reaction to the force of the wedge against the first beam, and only the bolt opposes said reaction via the unthreaded holes.

12. The apparatus of claim 10, wherein the ramp of the wedge has a taper angle of less than 7 degrees.

13. The apparatus of claim 10, wherein the ramp of the wedge has a taper angle of less than 4 degrees.

14. The apparatus of claim 10, wherein no part of the second beam directly contacts the wedge on an opposite side of the wedge from the ramp.

15. The apparatus of claim 10, wherein the wedge comprises a cylindrical ramp surface providing a varying ramp angle defined by a plane that is tangent to the cylindrical ramp surface at a line of contact between the cylindrical ramp surface and the first beam, and the varying ramp angle progressively decreases to less than 7 degrees with the tightening of the bolt.

* * * * *